United States Patent Office 3,591,399
Patented July 6, 1971

3,591,399
CORROSION INHIBITIVE CADMIUM PHOSPHATE-CHROMATE PIGMENT
David B. Boies, Chicago, and William P. McDonald, Park Forest, Ill., assignors to the United States of America as represented by the Secretary of the Navy
No Drawing. Filed Aug. 12, 1969, Ser. No. 849,486
Int. Cl. C09c 1/10, 1/34; C08b 17/04
U.S. Cl. 106—301                2 Claims

ABSTRACT OF THE DISCLOSURE

A pigment composition for preventing corrosion of aluminum comprising:

| | Percent by weight |
|---|---|
| CdO | 49.4 |
| $CrO_3$ | 19.3 |
| $P_2O_5$ | 16.5 |
| KOH | 14.8 | and the method of producing it.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the invention

This invention relates generally to novel pigment compositions and more particularly to phosphate-chromate pigments which impart superior anticorrosive characteristics to primers when applied to crevice areas on aluminum surfaces.

(2) Description of the prior art

There have been many pigment formulations developed for use within various primer formulations, which, when applied to aluminum surfaces, will enhance the protection thereof against the insidious encroachment of corrosion. Heretofore the most successful anticorrosive pigments incorporated the use therein of chromium materials. However such formulations were not entirely successful since aluminum corrosion once initiated tended to spread rapidly, particularly in crevice areas or under blisters. The present novel pigment formulation provides improved protection at such areas.

SUMMARY OF THE INVENTION

Thus, the present invention involves a novel phosphate-chromate pigment with the empirical formula of $6CdO \cdot 4CrO_3 \cdot 2P_2O_5 \cdot K_2O$. This pigment when added to a suitable primer will provide improved protection of aluminum surfaces, especially at crevice areas.

STATEMENT OF THE OBJECTS OF INVENTION

It is an object of the present invention to provide a pigment having improved corrosion inhibitive characteristics when incorporated in a suitable primer and applied to an aluminum surface, particularly crevice areas thereof.

Another object of the present invention is to provide a novel anticorrosion pigment formulation for the protection of crevice areas on aluminum surfaces which is both economical and effective in use.

DESCRIPTION OF THE PREFERRED EMBODIMENT

This invention includes a phosphate-chromate pigment comprising:

| | Percent |
|---|---|
| CdO | 49.4 |
| $CrO_3$ | 19.3 |
| $P_2O_5$ | 16.5 |
| KOH | 14.8 |
| | 100.0 |

The empirical formula is $6CdO \cdot 4CrO_3 \cdot 2P_2O_5 \cdot K_2O$.

From the above description it is seen that the formulation is a cadmium-potassium mixed cation pigment containing a mixed chromate-phosphate anion system.

In preparing the present pigment the cadmium oxide is dispersed in approximately four times its weight of water. The chromium trioxide and phosphorus pentoxide are added slowly with stirring and then the potassium hydroxide is added as a 50% solution until the pH is 6.8. Stirring is continued for 24 hours, with potassium hydroxide added to maintain the pH at between 6.5 to 6.8. The supernatant liquid is then decanted and the solid material is dried first on a vacuum filter and then over calcium chloride. The dried pigment is then ball-milled.

This pigment along with other test samples were formulated into suitable primers. The pigment content was adjusted on the basis of standard oil-adsorption tests using the particular specification vehicle-solvent mixture as the oil. Formulations were ball-milled for at least 24 hours before using.

The following table shows the corrosion results obtained when the present pigment and specified test pigments were incorporated into alkyd primers which in turn were sprayed on test panels. The test panels were constructed of aluminum, and were cleaned and deoxidized. Countersink holes were bored in the panels and cadmium-plated steel bolts inserted, using cadmium-plated washers and nuts. The panels were sprayed with the test coating, with a second coat applied along the edges by brush to eliminate edge effects. Panels were allowed to dry at least one week before exposure. Before testing, the coating was scratched near one edge.

TABLE I.—RESULTS OF CORROSION TESTS

| | 17 weeks | | Fastener area | |
|---|---|---|---|---|
| Pigment | General panel | Scratch | Aluminum | Cadmium |
| Cadmium chromate | 0 | 0 | S | M |
| Zinc-cadmium chromate | 0 | 0 | M | S |
| Cadmium phosphate-chromate | 0 | 0 | VS | VS |
| Cadmium silicate-chromate | S, B | 0 | S | M |
| Cadmium tungstate | M, B | 0 | S | M |
| Graphite | S, B | VS | VS | M |
| Aluminum | M | VS | M | H |

Legend: 0= no corrosion; VS= very slight corrosion; S=slight corrosion; M=moderate corrosion; H=heavy corrosion; B=blistering.

The test panels were suspended around the periphery of the test vessel, ½ inch above the liquid level. The test solution was a 3% sodium chloride brine. For a period of 20 minutes every 2 hours the brine was splashed onto the test panels. The brine solution was changed every 48 hours to prevent accumulation of inhibitive ions.

The graphite and aluminum pigments were formulated without inert fillers.

It will be noted that the cadmium phosphate-chromate pigment of the present invention provided good protection to the general area of the panel. The corrosion protection in the fastener area was the best obtained with any of the primers tested. There was no corrosion on the cadmium plated fastener, and either zero or very slight corrosion in the various crevice areas.

The mechanism by which the cadmium-phosphate pigment operates is believed to involve the solubility thereof in water. If its solubility is too high the pigment will be leached rapidly forming blisters. If the pigment is too insoluble, the concentration of the inhibitive materials will be too low to be effective.

The following table shows the results obtained on leaching of the present pigment and other standard pigments from alkyd primer films. The tests were run for three weeks in a 3% sodium chloride brine.

TABLE II.—PRIMER LEACHING TESTS

| Pigment | Composition of solution after 3 weeks, p.p.m. | | |
|---|---|---|---|
| | $CrO_4^-$ | Cd | Other |
| Cadmium phosphate-chromate | 70 | 252 | $PO_4^-$, 77 |
| Zinc yellow | 100 | | |
| Cadmium-zinc chromate | 90 | 154 | Zn, 63 |
| Cadmium chromate | 115 | 240 | |
| Cadmium silicate-chromate | 9 | 35 | |

From the results it is seen that the cadmium-phosphate-chromate is in a range somewhat similar to that of zinc yellow. However cadmium silicate-chromate leached to a much lower degree which probably accounts for the poorer corrosion characteristics of this material.

It is claimed:
1. A pigment composition for preventing corrosion of aluminum comprising:

| | Percent by weight |
|---|---|
| CdO | 49.4 |
| $CrO_3$ | 19.3 |
| $P_2O_5$ | 16.5 |
| KOH | 14.8 |

2. A method for the production of a pigment which prevents corrosion on aluminum surfaces comprising:
dispersing cadmium oxide in approximately four times its weight of water,
adding thereto chromium trioxide with stirring,
adding thereto phosphorous pentoxide slowly with stirring,
adding 50% potassium hydroxide until the pH of said solution is maintained at between 6.5 and 6.8 with constant stirring for 24 hours,
decanting the supernatant liquid,
drying the remaining solid material, and
milling the dried pigment, said oxides and hydroxide being in proportions to produce the pigment composition of claim 1.

No references cited.

TOBIAS E. LEVOW, Primary Examiner

J. V. HOWARD, Assistant Examiner

U.S. Cl. X.R.

106—302